Patented Feb. 22, 1938

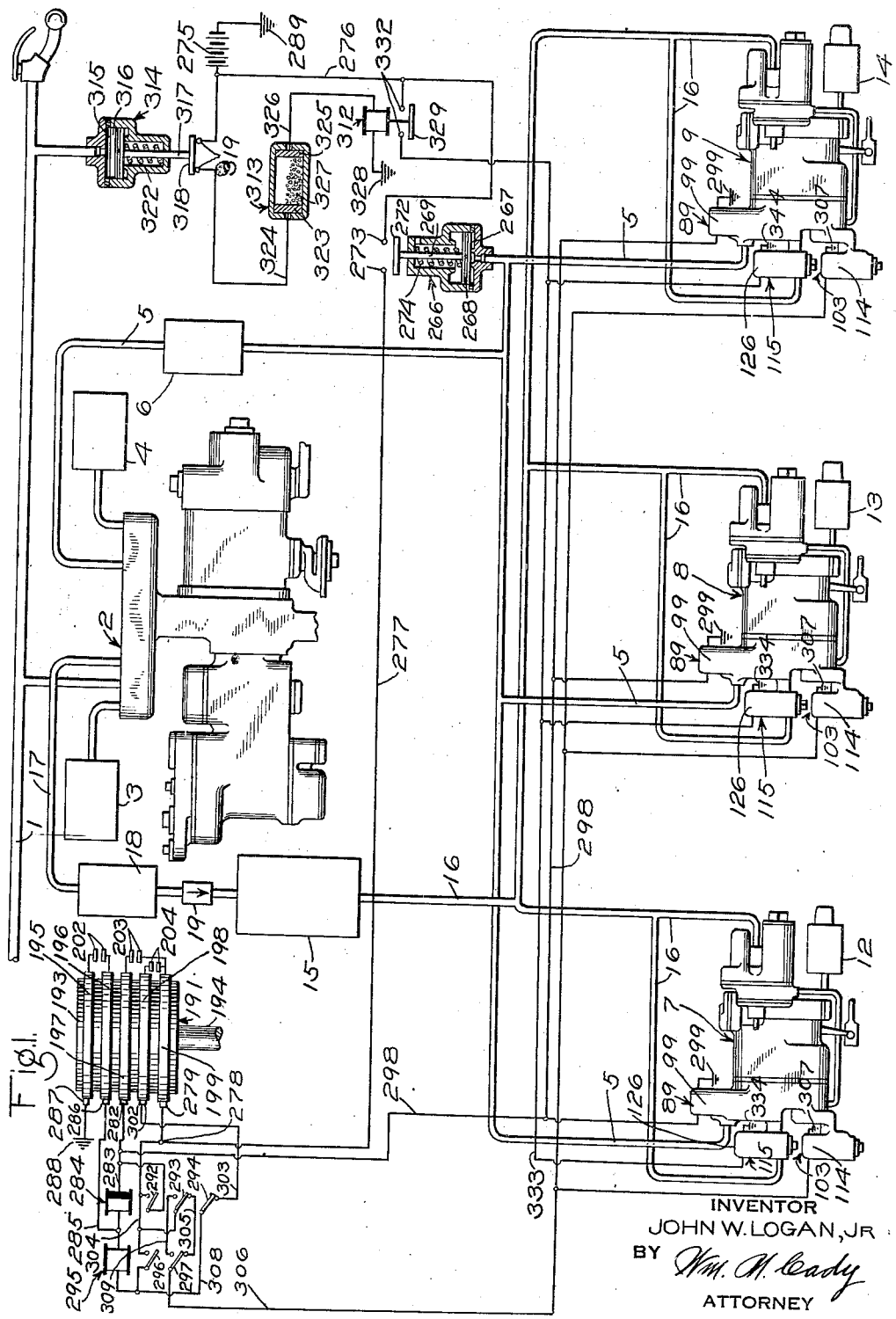

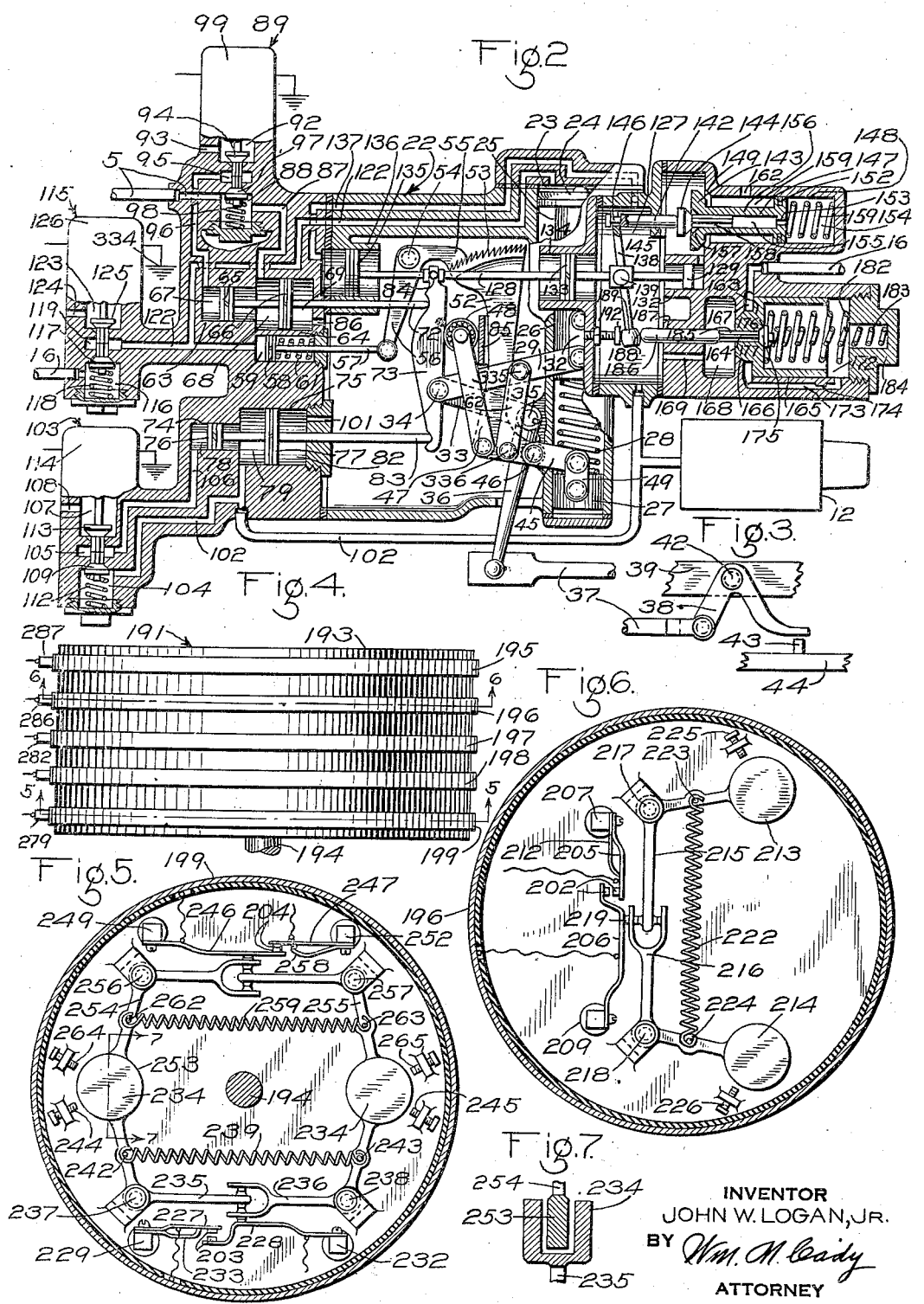

2,109,167

UNITED STATES PATENT OFFICE 2,109,167

HIGH SPEED BRAKE EQUIPMENT

John W. Logan, Jr., Forest Hills, Pa., assignor to The Westinghouse Air Brake Company, Wilmerding, Pa., a corporation of Pennsylvania Application February 28, 1936, Serial No. 66,234

40 Claims. (Cl. 303—22)

My invention relates to braking equipment for vehicles and more particularly to automatic braking equipment adapted for high speed vehicles or trains.

It is well known that in friction type brakes a greater braking force is required to produce a given braking action at high vehicle speeds than at lower vehicle speeds due to the lower coefficient of friction between the brake shoes and the wheels at the higher speeds. It therefore becomes desirable to apply the brakes with a higher braking force when the vehicle is traveling at a high rate of speed and to decrease the braking force as the speed of the vehicle reaches a relatively low value in order to decrease the likelihood of the wheels sliding on the rails. It is also desirable where the maximum degree of braking is required to apply the brakes in varying amounts on different cars or trucks depending upon the varying loads on those cars or trucks.

In order to achieve the flexibility of control desirable on high speed trains, braking systems have heretofore been employed providing dual control means, such as a straight air control portion and an automatic control portion, the straight air control portion lending itself readily to flexible brake control for normal service application of the brakes and the auxiliary control portion being employed as a stand-by control equipment and for effecting emergency braking. In such dual control systems at least two train control pipes are required. In my proposed brake equipment provision is made for increasing the flexibility of control of brake equipment employing a single control portion only and therefore requiring a single train pipe line.

It is an object of my invention to provide a brake equipment requiring only a single train pipe line that is particularly adapted for use on high speed trains.

It is another object of my invention to provide a brake equipment having a plurality of ratios or steps between the pressure delivered by a control valve device and brake cylinder pressure, one of the plurality of steps being automatically selected in accordance with the vehicle speed at the time the brakes are applied, and automatically reduced to a lower step at a predetermined lower vehicle speed, to effect a lower brake cylinder pressure for the same pressure delivered by the control valve device.

It is a further object of my invention to provide means for modifying the braking produced by each braking unit in accordance with the degree of loading on the wheel axles of the individual braking units.

It is a further object of my invention to provide a brake equipment of the automatically controlled type for effecting a selected one of a plurality of different ratios between the pressure delivered by the control valve and brake cylinder pressure depending upon the vehicle speed at the time the brakes are applied, in which complete functioning of the brake cylinder pressure both in full service application and in emergency application may be obtained.

Other objects and advantages of my invention will be apparent from the following description of one preferred embodiment thereof, reference being had to the accompanying drawings in which, Fig. 1 is a diagrammatic view of a brake equipment organized in accordance with my invention, Fig. 2 is a vertical sectional view through the variable load relay valve device shown in Fig. 1, Fig. 3 is a view of the parts, by means of which the variable load mechanism is adjusted to the load on the car, Fig. 4 is an elevational view of the speed responsive switch illustrated in Fig. 1, Figs. 5 and 6 are sectional views taken on the dot and dash lines 5—5 and 6—6, respectively, in Fig. 4, and Fig. 7 is a detail sectional view of the speed responsive weight taken on line 7—7 of Fig. 5.

Referring to the drawings, and particularly to Fig. 1 thereof, the brake equipment illustrated comprises a brake pipe 1, normally charged with fluid under pressure, for controlling the operation of a control valve 2, which may be of the well known Westinghouse universal type, for controlling the supply of fluid under pressure from an auxiliary reservoir 3 and an emergency reservoir 4 to a control pipe 5 and a volume reservoir 6 for controlling the operation of relay valve devices 7, 8 and 9 associated with each of a plurality of braking units. The relay valve devices 7, 8 and 9 control, respectively, the supply of fluid under pressure to the brake cylinders 12, 13 and 14 as supplied from a supply reservoir 15 through the supply pipe 16. The supply reservoir 15 is charged from the brake pipe 1 through the universal valve device 2, pipe 17, service reservoir 18, and a one way check valve 19.

The relay valve devices 7, 8 and 9 are alike in construction and operation and, as shown in Fig. 2, include variable load mechanisms that are in general similar in construction to the variable load device disclosed in Patent Number 1,670,391 issued to Thomas H. Thomas on May 22, 1928, and assigned to the same assignee as this application, and which comprises a casing 22 having a chamber 23 containing a piston 24 having a hollow piston stem 25 that slides in a bore 26 of reduced diameter. In the lower portion of the bore 26 is disposed a dash-pot piston 27 between which and the piston 24 is interposed a spring 28 extending through the hollow interior of the piston stem 25.

A lever 29 is connected to the piston stem 25 through a link 32 and a lever 33 is pivotally connected to the free end of the lever 29 by means of a pin 34. The opposite end of the lever 33 is secured to a rotatable pin 35 and an arm 36 is also secured to said pin. The arm 36 is connected to a rod 37 which is in turn pivotally connected to a rocker arm 38 (Fig. 3) carried by a pivot pin 42 mounted on a portion of the car body 39. A member 43 is carried by the car truck 44 and positioned to be engaged by the free end of the rocker arm 38.

A lever 45, fulcrumed on a fixed pin 46, is connected at one end to a link 47 carrying a roller 48 at its free end, and the opposite end of the lever 45 is connected through a link 49 to the piston 27. An arm 52 is carried by the lever 45 and is provided at its free end with a toothed segment 53.

Fulcrumed on a fixed pin 54 is a rocker arm having a pawl arm 54 provided with means adapted to engage the teeth of segment 53 and having an arm 56 that is connected to a stem 57 of a piston 58 contained within a piston chamber 59 in the wall of the casing structure. The lever 29 is also connected to the lever 45 by a link 62.

Bores 63 and 64 are provided in the casing having pistons 65 and 66 contained therein providing chambers 67, 68 and 69, the pistons being connected by a stem 72 which engages the upper end of a fulcrum plate 73. Axially arranged bores 74 and 75 are also provided in the casing structure having pistons 76 and 77, respectively, contained therein providing chambers 78, 79 and 82, the pistons being connected by means of a stem 83, the outer end of which engages the lower end of the fulcrum plate 73. The fulcrum plate 73 is pivotally supported by a pin 84 on the rod or stem 128 and the roller 48 is interposed between the face of the fulcrum plate 73 and the face of a member 85 carried by the casing structure.

The chamber 69 is connected to the atmosphere through a port 86, the chamber 68, between the pistons 65 and 66, is connected to the control pipe and passage 5 through passage 87 and valve chamber 88, and a magnet valve device 89 is provided for controlling communication between the chamber 67 and the control pipe 5 or the atmosphere.

The magnet valve device 89 comprises a casing providing a valve chamber 92 that is in constant communication with the atmosphere through the exhaust port 93, and which contains a valve 94 for controlling communication between a chamber 95, that is constantly connected to the chamber 67 through passage 96, and the atmosphere. The casing also provides the aforenamed valve chamber 88 containing a valve 97 for controlling communication between the chambers 88 and 95. An upwardly extending stem of the valve 97 engages a downwardly extending stem of the valve 94 in the chamber 95. A spring 98 is provided within the valve chamber 88 for normally urging the valve 97 upwardly toward its seat and the valve 94 upwardly from its seat. A magnet 99 is provided in the upper part of the casing which, when energized, moves the valve stems, together with the valves 94 and 97, downwardly to seat the valve 94 and unseat the valve 97.

The chamber 82 is connected to the atmosphere through port 101, the chamber 79 between the pistons 76 and 77 is in constant open communication with the brake cylinder 12 through brake cylinder pipe and passage 102, and communication between the chamber 78 and the atmosphere or the brake cylinder 12 is controlled by a magnet valve device 103.

The magnet valve device 103 comprises a casing providing a valve chamber 104 that is in constant communication with the brake cylinder 12 and the chamber 79 through brake cylinder pipe and passage 102, a chamber 105 that is in constant communication with the chamber 78 through passage 106, and a valve chamber 107 that is in constant communication with the atmosphere through port 108. A valve 109 is provided in the chamber 104 for controlling communication between the brake cylinder and the chamber 78 and is normally urged to its seat by a spring 112 in the chamber 104 and is provided with an upwardly extending stem for engaging the stem of a valve 113 provided in the valve chamber 107 which is forced from its seat upon the seating of the valve 109. A magnet 114 is provided in the upper part of the casing for urging the valves 113 and 109 downwardly to seat the valve 113 and unseat the valve 109.

A magnet valve device 115 is provided for controlling the supply of fluid under pressure to the latch releasing piston chamber 59 and the main weighing piston chamber 23 and comprises a casing providing a valve chamber 116 that is in constant communication with the supply pipe 16 and which contains a valve 117 that is normally urged to its seat by the spring 118. The casing also provides a chamber 119 that is in constant open communication with the piston chambers 59 and 23 through passage 122, and a chamber 123 that is in constant communication with the atmosphere through exhaust port 124 and which contains a valve 125 having a stem engaging the stem of the valve 117 to effect like up and down movement of the two valves. A magnet 126 is provided in the upper part of the casing which, when energized, forces the valve 125 downwardly to its seat and the valve 117 downwardly from its seat.

The casing 22 also provides a pressure chamber 127 into which extends a stem 128 that is pivotally connected to the upper part of the fulcrum lever 73 and on the inner end of which a guide member 129 is provided that slides in a bore 132 in the casing. A sealing piston 133 is carried by the stem 128 within a bore 134 and is subject on one side to brake cylinder pressure within the pressure chamber 127 and on the opposite side to atmospheric pressure. A balancing piston 135 of the same size as the sealing piston 133 is provided within a bore 136 and is attached to the other end of the stem 128, the bore 136 providing a chamber having fluid under pressure at brake cylinder pressure therein as supplied thereto from the pressure chamber 127 through the passage 137. The pressure on the left of the piston 135 thus balances the pressure on the right of the piston 133.

The stem 128 is provided with a pivot pin 139 intermediate the piston 133 and the guide member 129 upon which is mounted a rockable lever 138.

The lever 138 is provided with oppositely disposed arms extending upwardly and downwardly from the stem 128 and adapted to control the operation of a release valve mechanism and of a supply valve mechanism respectively.

The valve mechanism for controlling the pressure in the pressure chamber 127 and in the brake cylinder 12 may correspond to that described and claimed in copending application of Ellis E. Hewitt for Fluid pressure valve device, Serial No. 740,202, filed August 17, 1934 and assigned to the same assignee as this application.

The release valve mechanism comprises a plunger 142, a pilot release valve 144, and a main release valve 143. The plunger is slidably guided in a bore 145 in the casing wall and has a reduced diameter at the point indicated by the numeral 146 to provide spaced shoulders that are adapted to be operatively engaged by convex surfaces on the opposite sides of the upwardly extending arm of the lever 138, the end portion of the lever being formed to accommodate the portion 146 of the plunger.

The main release valve 143 is provided with a stem 147 that is in axial alignment with the plunger 142 and is positioned within a bore 148 provided at one end with a valve seat 149 for the release valve 143.

The valve stem is integrally connected to a piston 152 that is slidably mounted in the bore 148 and through which is provided a small port 153 which connects a chamber 154 at one side of the piston 152 with a chamber 155 formed within a bore 156 extending centrally of the stem 147 and terminating in a pilot valve seat 157 against which the pilot valve 144 is adapted to seat.

The pilot release valve 144 is in axial alignment with the plunger 142 and with the main release valve 143 and is provided with a stem 158 which passes longitudinally through the bore 156 in the main release valve stem. A spring 159 is provided within the chamber 154 at the right of the piston 152 for forcing the release valve stem and the main release valve 143 from its seat in a manner to be later described. A chamber 159 is provided about the stem 147 and is in constant communication with the atmosphere through the exhaust port 162 and is adapted to be connected to the pressure chamber 127 upon the unseating of the main release valve 143.

It will be understood from the foregoing description of the release valve assembly that when the pilot valve 144 is unseated as shown in Fig. 2 there will be an open communication from the chamber 154 to the pressure chamber 127 through the chamber 155 in the valve stem 147.

A supply valve mechanism is provided comprising a valve piston 163 integrally connected with the main supply valve 164 and slidably guided in a bore 165 in the casing 22. At the inner end of this bore a valve seat 166 is provided for the supply valve 164 which surrounds the entrance to a chamber 168 that is in constant open communication with the pressure chamber 127 through passage 169. The supply valve 164 is movable into or out of seating engagement with the valve seat 166 to control communication between the chamber 167 surrounding the valve and the pressure chamber 127. The chamber 167 is in constant communication with the supply pipe 16.

At the side of the valve piston 163 opposite the chamber 168 there is provided a chamber 172 that is connected to the chamber 167 by passage 173 through which is provided a choke 174 for restricting the rate of flow of fluid under pressure to and from the chamber 172.

Contained in the chamber 172 is a pilot supply valve 175 which is adapted to move into and out of engagement with the seat 176 provided on the valve piston 163 to control communication through a central bore 177 in the valve piston from the chamber 172 to the chamber 168.

Also contained in the chamber 172 are control coil springs 182 and 183 which at all times urge the supply valve 164 and the pilot supply valve 175, respectively, toward their seats. The spring 182 is interposed between and operatively engages the piston 163 and a cap nut 184 which closes an opening in the casing 22. The spring 183 is encircled by the spring 182 and is interposed between and operatively engages the cap nut 184 and a spring seat on the pilot supply valve 175.

The pilot supply valve 175 is provided with a fluted stem 185 which is slidably guided in a bore in the supply valve 164. When the pilot valve 175 is seated the stem 185 is adapted to be operatively engaged by one end of a valve controlling plunger 186 which is axially aligned with the valve piston and pilot supply valve and which is slidably guided in a bore 187 in the casing structure.

The outer end of the plunger 186 operatively engages a convex surface 188 provided on the lower end of the arm 138. The opposite side of the arm 138 is provided with a convex surface 189 which is adapted to engage the convex face of a fulcrum member 192 that is screw-threadedly attached in a bore in the casing structure.

The speed responsive switch device 191 shown in Figs. 1, 4, 5 and 6 comprises a drum 193 of insulating material having conducting rings 195, 196, 197, 198 and 199 positioned about the circumference thereof, and containing cooperating pairs of contact members 202 that are arranged to control an electrical connection between conducting rings 195 and 196 (see Figs. 1 and 6), and cooperating pairs of contact members 203 and 204 (see Figs. 1 and 5). Contact members 203 are connected to control a circuit between conducting rings 197 and 199 and the cooperating pair of contact members 204 is connected to control a circuit between the conducting rings 198 and 199. Speed responsive mechanism is provided for maintaining the contact members 202 out of engagement when the speed of the vehicle is below some predetermined low value, say 20 miles per hour, and for effecting engagement of these contact members when the speed of the vehicle is above 20 miles per hour. Similarly the cooperating contact members 203 are held out of engagement when the vehicle speed is below some predetermined intermediate value, say 60 miles per hour, and actuated into engagement as the vehicle speed reaches 60 miles per hour, and the cooperating contact members 204 are maintained in engagement until some predetermined higher speed, say 90 miles per hour is reached at which these contact members are separated.

Referring particularly to Fig. 6 of the drawings, the cooperating contact members 202 are mounted respectively on spring supports 205 and 206 that are mounted on studs 207 and 209 carried by a wall within the drum 193, and a stop 212 is also mounted on the stud 207 to prevent the spring member 205 from moving past a predetermined position toward the left when the spring member 206 is moved to effect the separation of the cooperating contact members 202. Inertia responsive elements 213 and 214 are provided and are carried by levers 215 and 216, that are mounted on pins 217 and 218, respectively. The lower end of the lever 215 is arranged to engage snugly within the upper bifurcated end of the lever 216 that is adapted to actuate the spring member 206 by means of an operating insulating contact member 219. The inertia members 213 and 214 are normally urged toward each other by a spring 222 one end of which is attached to the inertia carrying end of the lever 215 by the pin 223 and the other end of which is attached to the inertia carrying arm of the lever 216 by the pin 224. The inertia members 213 and 214 are urged away from each other by centrifugal force upon the revolving of the drum 193, their outward movement being limited by stops 225 and 226, respectively, provided for this purpose.

Referring to Fig. 5 the cooperating contact members 203 are mounted on the spring supports 227 and 228 that are in turn supported on the studs 229 and 232, respectively, carried by the drum 193. A stop member 233 is also mounted on the stud 229 to prevent the spring member 227 from carrying the upper illustrated contact member 203 beyond a predetermined position upon the downward movement of the spring support 228 and the lower contact member 203. The inertia elements 234 are bifurcated in form (see Fig. 7), and are mounted on the outer ends of levers 235 and 236, respectively, for controlling the operation of the contact members 203 that are supported in pins 237 and 238, respectively. The inner end of the lever 235 is arranged to snugly interfit within the bifurcated inner end of the lever 236 which when forced outwardly causes the spring support member 228 to move the outer end of the contact members 203 out of engagement with its cooperating contact member. A spring 239 is provided, one end of which is attached to the inertia element arm of the lever 275 by a pin 242 and the other end of which is attached to the inertia carrying arm of the lever 236 by a pin 243 for urging these arms and the inertia elements 234 toward each other against the centrifugal force occasioned by their revolution about the shaft 194. Stops 244 and 245 are provided for limiting the outward movement of the inertia elements 234.

The contact members 204 are carried on spring supporting members 246 and 247 that are mounted on the supporting studs 249 and 252, respectively. For operating the contact members 204 inertia elements 253 (see Fig. 7) are provided that are of less weight than the above named inertia elements 234 and are arranged to be positioned between the bifurcated portions of the inertia elements 234. The inertia elements 253 are carried by levers 254 and 255 mounted on the supporting pins 256 and 257, respectively, the inner end of the lever 255 being adapted to interfit the bifurcated inner end of the lever 254 that is adapted to actuate the spring support 246 to cause engagement or separation of the contact members 204. A stop member 258 is also carried by the stud 252 to limit the inward movement of the spring support member 247 as the spring member 246 moves inwardly, to thus effect separation of the contact members 204. The inertia carrying arms of the levers 254 and 255 are normally urged toward each other by a spring 259 one end of which is attached to the lever 254 by the pins 262 and the other end of which is attached to the lever 255 by the pin 263. Stop members 264 and 265 are provided for limiting the outward movement of the inertia elements 253.

Operation

The system is initially charged from the brake pipe 1, fluid under pressure flowing therefrom through the universal control valve 2 in a well known manner to charge the auxiliary reservoir 3 and the emergency reservoir 4 and also to charge the service reservoir 18 through pipe 17. The supply reservoir 15 and the supply pipe 16 are charged from the service reservoir 18 through a one way check valve 19. The valve chamber 116 of the variable load control magnet valve device 115 of the relay valve is charged from the supply pipe 16, as is also the supply chamber 167, from which fluid under pressure is supplied to the chamber 172 through passage 173 and the restricted port 174.

When the operator wishes to apply the brakes, he moves a brake valve device of the usual kind to a brake applying position to effect a reduction in brake pipe pressure, which causes operation of the universal control valve device 2 in a well known manner to effect the supply of fluid under pressure from the auxiliary reservoir 3 to the control pipe 5 when the brake pipe pressure is reduced at a service rate, and to effect the supply of fluid under pressure both from the auxiliary reservoir 3, the service reservoir 18, and the emergency reservoir 4 to the control pipe 5 if the reduction in brake pipe pressure is effected at an emergency rate. The pressure in the control pipe 5 is therefore determined by the rate and amount of reduction in brake pipe pressure.

As pressure builds up in the control pipe 5 it correspondingly builds up within the chambers 88 and 68 in each of the relay valve devices 7, 8 and 9 that are in constant communication with the control pipe 5, and if the magnet of the magnet valve device 89 is deenergized effects a force on the stem 72 that is dependent upon the differential pressures on the two pistons 65 and 66 that are connected together by the stem 72 and form opposite walls of the chamber 68. The stem 72 thus exerts a pressure on the fulcrum plate 73 tending to move it in a clockwise direction about the roller fulcrum 48 to force the stem 128 toward the right. The initial movement of the stem 128 toward the right, and of the pin 139 carried thereby, causes the lever 138 to fulcrum about its lower end, thus forcing the pilot release valve 144 to its seat to close communication between the pressure chamber 127 and the chamber 154. A slight further movement of the stem 128 toward the right causes the main release valve 143 to be moved toward the right to its seat 149 to close communication from the pressure chamber 127 to atmosphere through the chamber 159 and the exhaust port 162.

Further movement of the stem 128 toward the right causes the lever 138 to fulcrum about the shoulder adjacent the decreased section 146 of the valve controlling plunger 142, thus moving the lower end of the lever 138 away from the fulcrum member 192 against the end of the valve controlling plunger 186 that engages the stem 185 of the pilot supply valve 175, thus forcing the pilot supply valve from its seat against the bias of the spring 183 and permitting fluid under pressure to flow from the chamber 172 to the pressure chamber 127 past the unseated pilot supply valve 175 through the bore 177, the chamber 168 and the passage 169 to very rapidly decrease the pressure within the chamber 172. Upon the decrease in pressure in the chamber 172 the pressure in the supply chamber 167 against that portion of the piston 163 surrounding the main supply valve 164 causes the piston 163 and the valve 164 to be moved to the right against the bias of the spring 182 thus permitting a rapid flow of fluid under pressure from the supply chamber 167 through the chamber 168 to the pressure chamber 127 and to the brake cylinder 12 to effect an application of the brakes.

As the pressure in the chamber 127 and in the brake cylinder 12 builds up, pressure correspondingly builds up within the chamber 79, and, if the magnet valve 103 is unenergized and the valve 109 seated, causes a force to be exerted on the stem 83 that corresponds to the differential pressures on the pistons 76 and 77 that are connected to the stem 83 and form opposite walls of the chamber 79.

As the pressure within the chamber 79 builds up to a value sufficient to cause the moment of force exerted by the stem 83 on the fulcrum lever 73 to slightly exceed the moment of force exerted by the stem 72, the fulcrum lever 73 is rotated slightly in a counterclockwise direction about the roller fulcrum 48, thus moving the stem 128 and the pin 139 carrying the lever 138 slightly toward the left and permitting the lower end of the lever 138 to release pressure on the valve control plunger 186 sufficient to permit the pilot supply valve 175 to be forced to its seat by the spring 183 to thus close communication between the chamber 172 and the chamber 168.

Upon the seating of the pilot supply valve 175 the flow of fluid under pressure from the supply chamber 167 to the piston chamber 172 through the passage 173 and the choke 174 causes the pressure in the chamber 172 to be built up to supply chamber pressure and to thus overcome the pressure in the chamber 167 exerted upon the valve piston 163, and together with the force of the spring 182, to cause movement of the piston toward the left to seat the valve 164 on the valve seat 166, to close communication from the supply chamber 167 to the pressure chamber 127 and the brake cylinder 12. The pressure within the brake cylinder 12 and within the chamber 79 necessary to cause the supply valve 164 to engage a seat is dependent upon the pressure in the control pipe 5 and the chamber 68.

The ratio between the pressure in the control pipe 5 and the pressure in the brake cylinders 12, 13 and 14 is controlled by the magnet valve devices 89 and 103. Referring to Fig. 2 it will be noted that when the magnet 99 of the magnet valve device 89 is deenergized, and the valves 94 and 97 are in their upper or illustrated positions, the chamber 67 is vented to the atmosphere through passage 96, chambers 95, 92 and exhaust port 93. As pressure builds up in the chamber 68 therefore the force on the stem 72 is determined by the differential areas of the pistons 65 and 66. When, however, the magnet 99 of the magnet valve device 89 is energized, thus forcing the valve 94 to its seat and the valve 97 from its seat, fluid under pressure also flows from the control pipe 5 past the unseated valve 97, through chamber 95 and passage 96, to the chamber 67 to cause the pressures in the chambers 67 and 68 to correspond to control pipe pressure, so that the force on the stem 72 is determined by the area of the piston 66.

Similarly, when the magnet 114 of the magnet valve device 103 is deenergized, and the valves 113 and 109 are in their upper or illustrated positions, the chamber 78 is vented to the atmosphere through passage 106, chamber 105, valve chamber 107, and exhaust port 108 and the pressure on the stem 83 is determined by the differential areas of the pistons 76 and 77. When, however, the magnet 114 is energized, the valve 113 is forced to its seat and the valve 109 is forced downwardly from its seat against the bias of the spring 112, fluid under pressure at brake cylinder pressure flows through pipe and passage 102, valve chamber 104, chamber 105, and passage 106 to the chamber 78, thus applying brake cylinder pressure to both sides of the piston 76 so that the pressure on the stem 83 is determined by the pressure within the chamber 79 and the area of the piston 77.

For purposes of illustration, let us assume that the area of the piston 65 is equal to forty per cent of the area of the piston 66, that the area of the piston 76 is equal to twenty-five per cent of the area of the piston 66, and that the area of the piston 77 is equal to one hundred and twenty-five percent of the area of the piston 66. With these assumed areas of the several pistons involved and with the fulcrum roller 48 vertically midway between the stems or push rods 72 and 83, the pressure in the brake cylinder required to effect operation of the supply valve 164 to its seated position as above described will correspond to the pressure in the control pipe 5 when the magnet valve device 89 is energized and the magnet valve device 103 is deenergized; will correspond to eighty per cent of the pressure in the control pipe 5 when both magnet valve devices 89 and 103 are energized; will correspond to sixty per cent of the pressure in the control pipe 5 when both magnet valves 89 and 103 are deenergized; and will correspond to forty-eight per cent of the pressure in control pipe 5 when the magnet valve device 89 is deenergized and the magnet valve device 103 is energized. These ratios between control pipe pressure and brake cylinder pressure are maintained for each of the four pressure ratios above mentioned for any variation in control pipe pressure, assuming that the position of the roller fulcrum 48 does not change. The control of the magnet valve devices 89 and 103 is effected by operation of the speed responsive switch 193 in a manner to be presently described.

As previously stated, the several inertia and cooperating spring elements of the several speed responsive switches carried by the speed responsive switch device 191 are so adjusted that the contact members 202 remain out of engagement when the vehicle speed is below twenty miles per hour and in engagement when the vehicle speed is above twenty miles per hour, the contact members 203 are out of engagement for vehicle speeds below sixty miles per hour, and are in engagement for speeds above sixty miles per hour, and the contact members 204 are in engagement for speeds up to ninety miles per hour and out of engagement for speeds above ninety miles per hour.

A pressure responsive switch device 266 is provided and comprises a casing having a piston chamber 267 that is in constant open communication with the control pipe 5 and which contains a piston 268 having a stem 269 carrying a movable contact member 272 for cooperative engagement with the fixed switch contact members 273. A spring 274 is provided within the casing about the stem 269 for urging the piston 267 and the movable contact 272 downwardly when the pressure within the control pipe 5 and the piston chamber 267 drops below some relatively low predetermined value, such as five pounds pressure.

Upon a reduction in brake pipe pressure to effect an application of the brakes through operation of the universal control valve device 2, fluid under pressure is supplied to the control pipe 5 and when the pressure therein reaches the predetermined value of, say five pounds, the piston 267 and the switch contact member 272 are forced upwardly, thus closing a circuit from the positive terminal of the battery 275 through the conductor 276, contact members 272 and 273, conductor 277 to the junction point 278 from which point the circuit is completed through one or more of the speed responsive switches in accordance with the vehicle speed.

If, at the time the brakes are applied, the vehicle speed is above ninety miles per hour the contact members 204 will be separated, the contact members 203 will be in engagement, and the contact members 202 will also be in engagement. The circuit from the junction point 278 is thus completed through brush 279, collector ring 199, switch contact members 203, collector ring 197, brush 282, conductor 283, the winding of the relay 284, conductor 285, brush 286, collector ring 196, the switch contact members 202, collector ring 195, brush 287 to ground at 288, and to the grounded terminal 289 of the battery 275, thus energizing the winding of the relay 284 which has a slow pick up characteristic and operates after a short time interval to move the relay contact members 292, 293 and 294 upwardy. The upper relay contact member 292 closes a holding circuit from the junction point 278 to the conductor 283 in parallel relation with the switch contact members 203 to maintain the coil of the relay 284 energized after the contact members 203 are separated upon the decrease in speed of the vehicle below sixty miles an hour. The upward movement of the relay contact member 293 interrupts the circuit through the relay contact member 297 of the relay 295 in its lower position and the windings of the magnet valve devices 103, and the relay contact member 294 prevent the closing of the circuit through the winding of the relay 295 which would otherwise be established when contacts 204 close at 90 miles per hour. Upon completion of the circuit for energizing the winding of the relay 284, a circuit is also completed through the portion of the above traced relay circuit to conductor 283, then through conductor 298 to the windings of the magnets 99 of the magnet valve devices 89 on each of the relay valve devices 7, 8 and 9 to ground at 299, and to the grounded terminal 289 of the battery 275.

Referring to Fig. 2, energization of the magnet 99 causes the valves 94 and 97 to be forced downwardly, the valve 94 closing communication from the chamber 67 to the atmosphere through the exhaust port 93 and the valve 97 effecting communication from the control pipe 5 through valve chamber 88, chamber 95 and passage 96 to the chamber 67 to thus equalize the pressure on the two sides of the piston 65 and increase the force on the rod 72 accordingly. Since the magnet valve device 89 is energized and the magnet valve device 103 is deenergized, the largest possible force for a given control pipe pressure is exerted on the rod 72 and the smallest possible force for a given brake cylinder pressure is exerted on the rod 83, thus, as explained above, giving the highest ratio of control pipe pressure to brake cylinder pressure, or that corresponding to one hundred per cent of control pipe pressure if the fulcrum 48 is positioned mid-way between the rods 72 and 83.

As the vehicle slows down the ratio of control pipe pressure to brake cylinder pressure is maintained at its initial value until the vehicle speed has reached the lowest speed step or twenty miles per hour at which speed this ratio is changed to the lowest of the four ratios enumerated above. As the vehicle speed decreases below ninety miles an hour the switch contact members 204 are brought into engagement, thus bringing the potential of the control wire 277 through the switch contact members 204, the collector ring 198, brush 302, to the conductor 303, but, since the contact member 294 of the relay 284 is in its upper position, this circuit is interrupted at this point, and does not result in the operation of the relay 295, or in a change in the condition of the magnet valve devices 89 or 103. As the vehicle speed decreases to sixty miles per hour the contact members 203 separate, but, since the winding of the relay 284 is maintained energized by a holding circuit through the relay contact member 292 no change in the energization of the magnet valve devices 89 and 103 takes place.

When, however, the vehicle speed decreases to twenty miles an hour the contact members 202 separate, thus interrupting the circuit through the winding of the relay 284 and permitting the several relay contact members 292, 293 and 294 to drop to their lower or illustrated positions, thus interrupting the circuits through the windings of the several magnet valve devices 89 at the relay contact members 292 and effecting energization of the windings of the magnet valve devices 103 through a circuit extending through the above traced portion from the positive terminal of the battery 275 to the junction point 278, thence through conductor 304, relay contact member 293 in its lower position, conductor 305, relay contact member 297 in its lower position, conductor 306, through the windings of the magnets 114 in the several magnet valve devices 103 of the relay valve devices 7, 8 and 9, to ground at 307 and to the grounded terminal 289 of the battery 275.

The deenergization of the magnet valve device 89 effects the venting of the chamber 67 through the exhaust port 93 as above explained, and reduces the force on the rod 72 by the amount of the pressure on the right hand side of the piston 65 while the energization of the magnet valve device 103 effects the downward movement of the valves 113 and 109 against the bias of the spring 112 to close communication from the chamber 78 through passage 106, chamber 105, valve chamber 107 to the atmosphere through exhaust port 108, and effects communication from the brake cylinder 12 through pipe and passage 102, valve chamber 104, chamber 105, passage 106 to the chamber 78, thus effecting the supply of brake cylinder pressure both to the chamber 78 and the chamber 79 and increasing the force on the rod to its maximum value in terms of brake cylinder pressure. As above stated, this condition effects the lowest possible ratio between control pipe pressure and brake cylinder pressure or that corresponding to forty-eight per cent of control pipe pressure with the assumed ratios between the areas of the pistons 65, 66, 76 and 77 when the roller fulcrum 48 is midway between the rods 72 and 83.

The decreasing force exerted by the rod 72 on the fulcrum beam 73, and the increasing force exerted thereon by the rod 82, causes the fulcrum beam 73 to be rocked in a counterclockwise direction about the roller fulcrum 48 to move the stem 128 toward the left, thus correspondingly moving the pin 139 carrying the lever 138 which fulcrums about its lower end 188, the upper end being moved toward the left to effect movement of the valve operating plunger 142 and of the pilot valve 144 toward the left to permit the flow of fluid under pressure from the pressure chamber 127 past the unseated pilot valve 144 through the bore 155 and port 153 to the chamber 154, to exert a pressure on the piston 152 corresponding to the pressure chamber pressure exerted on the main release valve 143 thus equalizing the pressure on the opposite sides of these members and permitting the spring 159 to force the stem 156 toward the left to unseat the main release valve 143 and permit the release of fluid under pressure from the brake cylinder 12 and from the pressure chamber 127 to the atmosphere through the exhaust port 162. This reduction in brake cylinder pressure will continue until the pressure in the chambers 78 and 79 has reduced sufficiently to decrease the force on the rod 83 an amount permitting a slight clockwise rocking of the lever 73 about the fulcrum 48 to permit sufficient movement of the stem 128 toward the right to effect the seating of the pilot release valve 144 and of the main release valve 143 in the manner above described. Thus when the vehicle speed decreases to the selected value at which the contact members 202 are arranged to separate, which, for example, may be twenty miles an hour, automatic reduction in brake cylinder pressure takes place independently of a reduction in control pipe pressure. It will be appreciated that for any given ratio between control pipe pressure and brake cylinder pressure the operator may effect a desired variation in brake cylinder pressure by changing control pipe pressure through operation of the universal control valve 2 in response to a change in brake pipe pressure in the usual manner.

If, when the brakes are initially applied, the vehicle speed is above sixty miles an hour but below ninety miles an hour, with the assumed speed adjustments for the cooperating contact members 202, 203 and 204 each of these pairs of contact members will be closed. Upon closing of the pressure actuated switch 266 a circuit will therefore be completed from the positive terminal of the battery 275 through conductor 276, switch contact members 272 and 273, conductor 277 to the junction point 278, and through the brush 279, conducting ring 199, closed contact members 204, conducting ring 198, brush 302, conductor 303, the lower relay contact member 294 of the relay 284, conductor 308, the winding of the relay 295, conductor 285, brush 286, collector ring 196, the closed contact members 202, collector ring 195, brush 287 to ground at 288 and to the grounded terminal 289 of the battery 275. This circuit energizes the winding of the relay 295 causing the relay contact members 296 and 297 to be actuated to the upper circuit closing positions.

The contact member 296 completes a holding circuit between the junction point 278 and the conductor 398 in shunt relation to the circuit through the contact members 204 and the lower relay contact member 294, thus maintaining the relay 295 energized after the energization and operation of the relay 284. The closing of the switch 266 also effects the energization of the relay 284 by a circuit therethrough from the junction point 278 through contact members 203, to conductor 283 as previously traced, the winding of the relay 284, conductor 285 to ground at 288 as previously traced and to the grounded terminal 289 of the battery 275. The relay 284 has a time delay closing characteristic, thus permitting its contact members to remain in their lower or illustrated positions until after the relay 295 has become energized and operated as just described, after which time interval the contact members 292, 293 and 294 are operated to their upper positions. The contact member 292 closes a holding circuit in shunt relation to the switch contact members 203, as previously traced, and also connects the battery 275 to the windings of the magnet valve devices 89 through conductor 298 as previously traced. A circuit is also completed from the junction point 278 through conductor 304, relay contact member 293 in its upper position, conductor 309, the relay contact member 297 in its upper position, conductor 306 to windings of the magnets 114 of the magnet valve devices 103, to ground at 307 and to the grounded terminal 289 of the battery 275.

With the magnet valve device 89 energized, fluid under pressure at control pipe pressure is supplied to chamber 67 and 68 in the same manner as when the brakes are applied while the vehicle is traveling above ninety miles an hour. With the vehicle speed between sixty and ninety miles an hour at the time the application of the brakes is initiated, the magnet valve device 103 is also energized, thus effecting the supply of fluid to the chamber 78 at brake cylinder pressure, until the force on the rod 83 slightly exceeds the force on rod 72.

Assuming that the fulcrum roller 48 is midway between the rods 72 and 83, and on the basis of an area of one hundred per cent for the piston 66 and an area of one hundred and twenty-five per cent for piston 77, it will be seen that a brake cylinder pressure of only eighty per cent of the control pipe pressure in chamber 68 is attained when the rod 83 exerts a sufficient counterbalancing force to that exerted on the rod 72 to cause seating of the supply valve and the consequent closing off of the further supply of the fluid under pressure to the brake cylinder. Thus, the maximum initial brake cylinder pressure attained when an application of the brakes is initiated while the train is traveling at a speed between sixty and ninety miles per hour is eighty per cent of the pressure established in the control pipe 5.

When the vehicle speed decreases to sixty miles an hour the contact members 203 are separated, but since the circuit through these contact members is paralleled by the circuit through the contact member 292 of the relay 284, no change in the energization of the magnet valve devices occurs. When the decreasing vehicle speed reaches twenty miles per hour the contact members 202 are separated, thus interrupting the circuit through the winding of the relay 295 and winding of the relay 284 to cause the deenergization of these relays to effect operation of the several contact members to their lower or illustrated positions. The circuit through the windings of the magnet valve device 89 is thus interrupted by the relay contact member 292 and the circuit through the windings of the magnet valve devices 103 is completed from the junction point 278 through the conductor 304, contact member 293 in its lower position, conductor 205, contact member 297 in its lower position, and conductor 306 to ground 307 and to the grounded terminal 289 of the battery 275, thus again effecting the deenergization of the magnet valve devices 89 and the energization of the magnet valve devices 103 when the lower vehicle speed of twenty miles an hour is reached to again decrease brake cylinder pressure to approximately 48 per cent of control pipe pressure.

If the vehicle is traveling above twenty miles per hour but below sixty miles per hour at the time the brakes are applied, the contact members 202 will be in engagement, the contact members 203 will be separated and the contact members 204 will be in engagement. Thus the above traced circuit for energizing the winding of the relay 295 will be completed from the positive terminal of the battery 275 through the pressure operated switch contact members 272 and 273 to junction point 278, through the speed responsive switch collector ring 199, contact members 204, and collector ring 198, conductor 303, relay contact member 294 in its lower illustrated position, the winding of the relay 295, conductor 285, collector ring 196, contact members 202, collector ring 195, to ground at 288 and to the grounded terminal 289 of the battery 275, thus causing the contact members 296 and 297 of the relay 295 to be actuated to their upper circuit closing positions. The contact member 296 closes a holding circuit between junction point 278 and conductor 285 in shunt relation to that closed by contact members 204 as above described, and the contact member 297 performs no function in its raised position so long as the relay 284 remains deenergized. It will be recalled that the circuit for initially energizing the relay 284 was interrupted by the contact members 203 of the speed responsive switch device when the vehicle speed decreased below sixty miles an hour. With this application of the brakes both the magnet valve devices 89 and the magnet valve devices 103 remain deenergized and the pressure on the rod 72 is the differential pressures on the two pistons 65 and 66 within the chamber 68 which corresponds to control pipe pressure, while the pressure on the rod 83 is the differential pressures on the pistons 76 and 77 within the chamber 79 to which fluid under pressure at brake cylinder pressure is supplied. That is to say, representing the pressure on the rod 72 in terms of the effective differential area of pistons 65 and 66 as sixty per cent, and the pressure on the rod 83 in terms of the effective differential area of pistons 76 and 77 as one hundred per cent, the resultant brake cylinder pressure is sixty per cent of the pressure established in the control pipe, assuming that the fulcrum roller 48 is midway between the rods 72 and 83.

As the vehicle slows down the contact members 202 separate at twenty miles an hour vehicle speed, thus interrupting the above traced circuit through the winding of the relay 295 and permitting the contact members 296 and 297 to drop to their lower or illustrated positions, the contact member 297 completing the circuit above traced through the windings of the magnet valve devices 103 to effect the supply of fluid under pressure to the chamber 78 until the pressure therein corresponds to brake cylinder pressure. Due to the fact that brake cylinder pressure now acts on the area of piston 77 only, which area may be represented as one hundred twenty-five per cent, the brake cylinder pressure is accordingly reduced to forty-eight per cent of the control pipe pressure.

Let us summarize the four ratios between control pipe pressure and brake cylinder pressure effected by the four conditions above mentioned, using the assumed ratios between the areas of the various pistons, that is, the area of the piston 66 is 100 units, that of the piston 65 is 40, the area of the piston 77 is 125, and that of the piston 76 is 25, and assuming the roller 48 to be vertically midway between the rods 72 and 83. The highest ratio of brake cylinder pressure to control pipe pressure or that employed when the vehicle is traveling above ninety miles an hour is effected by energizing the magnet valve devices 89 while the magnet valve devices 103 are deenergized. The pressures on opposite sides of the piston 65 are thus equalized and the pressure on the rod 72 is accordingly in accordance with the area of the piston 66, or 100 units. When the pressure within the brake cylinder and within the chamber 79 is equal to control pipe pressure, the pressure on the rod 83 balances the pressure on the rod 72, because the pressure on the rod 83 is in accordance with the area of the piston 77 minus the area of the piston 76, that is to 125 minus 25 or 100 units.

The second named ratio between brake cylinder pressure and control pipe pressure, or that employed when the vehicle is traveling at a speed between ninety miles an hour and sixty miles an hour at the time the brakes are initially applied, is effected by energizing both of the magnet valve devices 89 and 103, thus effecting a pressure on the rods 72 and 83 in accordance with the areas of the pistons 66 and 77, respectively. The ratio of brake cylinder pressure to control pipe pressure thus effected is inverse to the ratio of the area of piston 77 to the area of piston 65, that is, it is in the ratio of 100 to 125 or 80 per cent of that for the first step.

The third ratio between brake cylinder and control pipe pressure is effected by deenergizing both magnet valve devices 89 and 103 so that the pressure on the rod 72 is in accordance with the differential of the pressures on the pistons 65 and 66, that is 100 minus 40 or 60 units, and the pressure on the rod 83 is in accordance with the differential in the pressures on the pistons 77 and 76, that is 125 minus 25 to 100 units. Thus, the ratio between the fluid pressures in the brake cylinder 12 and in the control pipe 5 necessary to balance the moments of rotation on the beam 73 about the fulcrum point 48 is the ratio of 60 to 100, or 60 per cent of that for the first step.

The fourth ratio between the brake cylinder pressure and control pipe pressures is effected by deenergizing the magnet valve device 89 and energizing the magnet valve device 103, thus effecting a force on the rod 72 that is in accordance with the differential of the pressures on the two pistons 65 and 66, that is 100 minus 40 or 60 units, and effecting a balancing force on the rod 83 in accordance with the area of piston 77 or 125 units, thus giving a ratio of brake cylinder pressure to control pipe pressure of 60 over 125 or 48 per cent of control pipe pressure.

The operation of the variable load mechanisms of the relay valve devices 7, 8 and 9 will now be described. A motion detecting relay 312 is provided that is energized through a circuit including the vibration detecting element 313 mounted on the car truck and a pressure operated switch device 314 comprising a casing providing a piston chamber 315 that is in constant communication with the brake pipe 1 and which contains a piston 316 having a stem 317 connected to a movable switch contact member 318 that is adapted to cooperate with fixed switch contact members 319. A spring 322 is provided within the casing about the stem 317 to bias the piston 316 and the switch contact member 318 upwardly against the force of fluid under pressure in the piston chamber 315. The switch device 314 is provided to prevent the battery 275 from being unnecessarily discharged when the equipment is not in use, such as when the vehicle is stored and the brake pipe pressure is permitted to fall below some predetermined low value such, for example, as 25 pounds pressure. At higher brake pipe pressures the piston 316 is forced downwardly against the bias of the spring 322, thus holding the switch contact member 318 in engagement with the switch contact members 319.

The variable resistance element 313 comprises an insulating casing containing a conducting plate 323 at one end that is connected to the conductor 324 and a similar conducting plate 325 at the other end that is connected to the conductor 326. The space between the plates 323 and 325 is partially filled with granules of conducting material such as carbon 327, which has the property of offering a higher resistance to the flow of electric current therethrough when agitated or vibrated, and a low resistance to the flow of current therethrough when at rest. The winding of the relay 312 is connected in a circuit extending from the positive terminal of the battery 275 through the switch contact members 318 and 319, conductor 324, plate 323, carbon granules 327, plate 325, conductor 326, the winding of the relay 312, to ground at 328 and to the grounded terminal 289 of the battery 275. When the vehicle is in motion the vibration of the element 313 carried on the car truck is sufficient to increase the resistance of the carbon granules 327 sufficiently to prevent a sufficient flow of current through the winding of the relay 312 to cause the relay to pick up. When, however, the vehicle is brought to a stop the resistance of the carbon granules 327 decreases to permit the energization of the relay 312 to cause the movement of the relay contact member 329 into engagement with the relay contact members 332 to close a circuit extending from the positive terminal of the battery 275, through conductor 276, relay contact members 329 and 332, conductor 333, the windings of the magnets 126 of the magnet valve devices 115 on the several relay valve devices 7, 8 and 9, to ground at 334 and to the grounded terminal 289 of the battery 275.

The magnet valve devices 115, thus energized, effect downward movement of the valves 125 and 117, thus closing communication from the piston chambers 23 and 59 to the atmosphere through the exhaust port 124 and effecting the supply of fluid under pressure from the supply pipe 16 to piston chambers 23 and 59 through valve chamber 116, chamber 119 and passage 122.

The spring 61 acting on the piston 58 is of such resistance as compared with spring 28 acting on the piston 24 that fluid under pressure will be effective to move the piston 24 downwardly before the piston 58 is moved toward the right. When the piston 24 is moved downwardly as viewed in Fig. 2, the lever 45 is locked against movement by engagement of the pawl arm 55 with the toothed segment 53 of the arm 52. The pin 335 which connects the link 62 to the lever 29 acts as a fulcrum for the lever 29, the link 62 being held against downward movement by the connection to the lever 45 through pin 336. The movement of the lever 29 about the fulcrum 335 causes a movement of the arm 33 and shaft 35 in a clockwise direction and consequently the movement of the arm 36 also in a clockwise direction to move the rod 37 toward the left.

The rocker arm 38, carried on a portion of the car body 39, is thus actuated about the pin 42 to cause the free end thereof to engage the member 43 carried on a portion of the truck structure 44.

After the above described movement of the parts, the piston 58 is shifted toward the right as viewed in Fig. 2 so that the pawl arm 55 is actuated to disengage the teeth of the pawl from the teeth of the toothed segment 53.

The rod 37 is now free to move according to the load on the car. If the load is increased the car body will move toward the truck and thus cause the member 43 to rock the rocker arm 38 and effect a corresponding movement of the rod 37 toward the right.

The piston 24 holds the adjacent end of the lever 29 against vertical movement and, the lever 45 being fulcrumed on the pin 46, the movement of the rod 37 toward the right causes a counterclockwise movement of the arm 33 and of the lever 29. The link 62 is thus moved downwardly and causes a counterclockwise movement of the lever 45 about its fulcrum pin 46 thus pulling the link 47 and the fulcrum roller 48 downwardly. Thus the position of the roller 48 is determined according to the load on the car. If the load is decreased, the parts will move in a reverse direction, as will be evident, and the roller 48 will be caused to move upwardly.

When the train is started, the vibration of the granules 327 in the tube of the device 313 increases the resistance in circuit with the windings of the relay 312 sufficiently to cause the relay windings to be deenergized and permit the contact member 329 to drop out of engagement with the contact members 332, thus interrupting the circuit through the windings of the magnets 125 of the magnet valve devices 115, and thus venting the piston chambers 59 and 23 to the atmosphere through the exhaust port 124 of the magnet valve devices 115.

Since the spring 61 exerts a greater pressure than the spring 28, the release of fluid under pressure from the piston chambers 59 and 23 through the passage 122 permits the piston 58 to be shifted by the spring 61 so that the pawl arm 55 is operated to cause the pawl teeth to engage the teeth of the segment 53 to lock the arm 52 against movement while the vehicle is in operation.

The piston 24 is then returned to its normal position, causing the rod 37 to be moved toward the right so that the free end of the rocker arm 38 is moved out of engagement with the member 43 thus preventing movement of the parts by the relative movement of the car body with respect to the truck while the car is running.

The piston 27 being connected to the lever 45 by the link 49 assumes a position in the bore 26 dependent upon the position of the roller 48.

The release of the brakes is effected by operation of the brake valve device to cause an increase in brake pipe pressure thus actuating the universal control valve in a well known manner to vent the control pipe 5 and the piston chamber 68 of the relay valve devices 7, 8 and 9 that are in constant open communication with the control pipe 5. When fluid under pressure is released from the chamber 68 the force on the rod 72 is reduced and the force of the rod 83 caused by brake cylinder pressure in the chamber 79 causes the fulcrum lever 73 to be moved in a counterclockwise direction to move the stem 128 toward the left, thus correspondingly moving the pivot pin 139. As the pivot pin 139 is moved toward the left the lower end of the arm of the lever 138 pivots on the fulcrum member 192 and the upper arm of the lever 138 is moved toward the left to correspondingly move the pilot valve plunger 142 and the release pilot valve 144. The pilot valve, thus moved from its seat, effects communication from the pressure chamber 127 to the chamber 154 past the unseated pilot valve, through chamber 155 and port 153, thus equalizing the pressures at opposite ends of the stem 147 and permitting the spring 159 to force the release valve 143 from its seat to open communication from the brake cylinder 12 and the pressure chamber 127 to the atmosphere through the exhaust port 162.

While one preferred embodiment of my invention has been illustrated and described it will be apparent to those skilled in the art that many modifications may be made in the apparatus and circuits described without departing from the spirit of my invention, and I do not wish to be limited otherwise than by the scope of the appended claims.

Having now described my invention, what I claim as new and desire to secure by Letters Patent, is:

1. In a brake equipment for vehicles, in combination, a brake pipe, means comprising a control valve device for supplying fluid under pressure in accordance with a reduction in brake pipe pressure, a plurality of braking means comprising a brake cylinder and means responsive to said supply of fluid under pressure comprising means for effecting one of a plurality of ratios between brake cylinder pressure and the pressure supplied by said control valve device, means for automatically selecting one of said ratios in response to vehicle speed, and means responsive to the load on the vehicle wheels associated with individual braking means for also varying the ratio between brake cylinder pressure and the pressure supplied by said control valve device.

2. In a brake equipment for vehicles, in combination, a brake pipe, means comprising a control valve device for supplying fluid under pressure in accordance with a reduction in brake pipe pressure, a plurality of braking means each comprising a brake cylinder and means responsive to said supply of fluid under pressure comprising means for effecting one of a plurality of ratios between brake cylinder pressure and the pressure supplied by said control valve device, means for automatically selecting one of said ratios in response to vehicle speed, means responsive to the load on the vehicle wheels associated with individual braking means for also varying the ratio between brake cylinder pressure and the pressure supplied by said control valve device, and means for automatically reducing the ratio between brake cylinder pressure and the pressure supplied by said control valve device upon a reduction in vehicle speed to a predetermined low value.

3. In a brake equipment for vehicles, in combination, a normally charged pipe, a normally uncharged control pipe, means comprising a control valve device for supplying fluid under pressure to said control pipe in accordance with a reduction in pressure in said normally charged pipe, a braking unit comprising a brake cylinder, a relay valve device operative to effect one of a plurality of certain uniform ratios between brake cylinder pressure and control pipe pressure, means responsive to vehicle speed for selecting one of said ratios to effect a higher brake cylinder pressure at a higher speed for a given control pipe pressure, relay means effective upon the selection of one of said plurality of ratios for maintaining said ratio during the deceleration of the vehicle to a predetermined low vehicle speed, and means operative at said predetermined low vehicle speed for reducing the ratio between brake cylinder pressure and control pipe pressure.

4. In a brake equipment for vehicles, in combination, a normally charged pipe, a normally uncharged control pipe, means comprising a control valve device for supplying fluid under pressure to said control pipe in accordance with a reduction in pressure in said normally charged pipe, a plurality of braking units each comprising a brake cylinder, a relay valve device operative to effect one of a plurality of ratios between brake cylinder pressure and control pipe pressure, and means responsive to vehicle speed and operative through a plurality of speed zones corresponding in number to said plurality of ratios for selecting a ratio corresponding to the speed zone at which the vehicle is traveling upon the application of the brakes, and means responsive to the load on the vehicle wheels of each braking unit for also varying the ratio between brake cylinder pressure and control pipe pressure for that unit.

5. In a brake equipment for vehicles, in combination, a normally charged pipe, a normally uncharged control pipe, means comprising a control valve device for supplying fluid under pressure to said control pipe in accordance with a reduction in pressure in said normally charged pipe, a braking unit comprising a brake cylinder, a relay valve device operative to effect one of a plurality of certain uniform ratios between brake cylinder pressure and control pipe pressure regardless of the pressure established in the control pipe, means responsive to vehicle speed and operative through a plurality of speed zones corresponding in number to said plurality of ratios for selecting a ratio corresponding to the speed zone at which the vehicle is traveling when the brakes are applied, relay means effective upon the selection of one of said plurality of ratios for maintaining said ratio during the deceleration of the vehicle to a predetermined low vehicle speed, and means operative at said predetermined low vehicle speed for reducing the ratio between brake cylinder pressure and control pipe pressure to a predetermined value.

6. In a brake equipment for vehicles, in combination, a normally charged pipe, a normally uncharged control pipe, means comprising a control valve device for supplying fluid under pressure to said control pipe in accordance with a reduction in pressure in said normally charged pipe, a plurality of braking units each comprising a brake cylinder, a relay valve device operative to effect one of a plurality of certain uniform ratios between brake cylinder pressure and control pipe pressure regardless of the pressure established in the control pipe, means responsive to vehicle speed and operative through a plurality of speed zones corresponding in number to said plurality of ratios for selecting a ratio corresponding to the speed zone at which the vehicle is traveling upon the application of the brakes, means effective upon the application of the brakes while in one speed zone for maintaining the selected ratio during deceleration of the vehicle through lower speed zones to a predetermined zone, and means for automatically selecting the pressure ratio corresponding to said predetermined zone upon the deceleration of the vehicle speed to within said zone.

7. In a brake equipment for vehicles, in combination, a normally charged pipe, a normally uncharged control pipe, means comprising a control valve device for supplying fluid under pressure to said control pipe in accordance with a reduction in pressure in said normally charged pipe, a plurality of braking units each comprising a brake cylinder, a relay valve device operative to effect one of a plurality of certain uniform ratios between brake cylinder pressure and control pipe pressure regardless of the pressure established in the control pipe, means responsive to vehicle speed and operative through a plurality of speed zones corresponding in number to said plurality of ratios for selecting a ratio corresponding to the speed zone at which the vehicle is traveling upon the application of the brakes, means effective upon the application of the brakes while in one speed zone for maintaining the selected ratio during deceleration of the vehicle to a predetermined speed value, and means for automatically selecting a lower predetermined ratio between said brake cylinder and said control pipe pressure at a predetermined speed value upon the deceleration of said vehicle to said value.

8. In a brake equipment for vehicles, in combination, a normally charged pipe, a normally uncharged control pipe, means comprising a control valve device for supplying fluid under pressure to said control pipe in accordance with a reduction in the pressure in said normally charged pipe, a plurality of braking units each comprising a brake cylinder, a relay valve device operated to effect any one of a plurality of certain uniform ratios between said brake cylinder pressure and control pipe pressure, magnet valve devices for controlling the selection of any one of said ratios, a centrifugal switch device operable in accordance with the speed of the vehicle and control circuits controlled thereby for governing said magnet valve devices to effect the selection of different ones of said certain uniform ratios between brake cylinder pressure and control pipe pressure in accordance with the vehicle speed at the time of the application of the brakes, interlock relays for maintaining the established control during the deceleration of the vehicle to a predetermined speed, and means controlled by said switch device and effective upon the deceleration of the vehicle to said predetermined speed for automatically controlling said magnet valve devices to effect the reduction from the initially established ratio to a predetermined lower ratio.

9. In a brake equipment for vehicles, in combination, a control pipe, means for supplying fluid under pressure to said control pipe in accordance with the desired degree of braking, a braking unit comprising a brake cylinder and a relay valve device for controlling the supply of fluid under pressure to said brake cylinder in accordance with the pressure in said control pipe, means for causing the relay valve device to operate to establish different predetermined uniform ratios between brake cylinder pressure and control pipe pressure for the same pressure established in the control pipe, means responsive to vehicle speed for controlling said last means to cause the relay valve device to establish different ones of said predetermined ratios for different vehicle speeds, relay means effective upon the selection of one of said predetermined ratios for maintaining said one ratio during the deceleration of the vehicle to a predetermined low vehicle speed, and means operative at said predetermined low vehicle speed for reducing the ratio between the brake cylinder pressure and control pipe pressure from the said one ratio to a predetermined low ratio.

10. In a brake equipment for vehicles, in combination, a control pipe, means for supplying fluid under pressure to said control pipe in accordance with the desired degree of braking, a brake cylinder, means for controlling the supply of fluid under pressure to said brake cylinder in accordance with the pressure in said control pipe comprising self-lapping valve means, a chamber subject to control pipe pressure, a valve control member responsive to the pressure in said chamber for actuating said valve means toward a brake applying position, a different chamber subject to brake cylinder pressure, a second valve control member responsive to the pressure in said different chamber for actuating said valve means from a brake applying position toward a brake releasing position, and additional means for influencing the forces on said two valve control members to provide different pressure ratios between brake cylinder pressure and control pipe pressure.

11. In a brake equipment for vehicles, in combination, a brake cylinder, a normally charged pipe, means for controlling the supply of fluid under pressure to said brake cylinder in accordance with the reduction in pressure in said normally charged pipe, a control circuit, electrical means operating on said circuit for governing the action of said brake controlling means, a source of electrical energy for supplying energizing current to said electrical means through said circuit, and a pressure operated switch operative upon a reduction in pressure in said normally charged pipe to a predetermined low value for effecting interruption of said control circuit.

12. In a brake equipment for vehicles, in combination, a control pipe, means for supplying fluid under pressure to said control pipe in accordance with the desired degree of braking, a braking unit comprising a brake cylinder and means for controlling the supply of fluid under pressure to said brake cylinder in accordance with the pressure in said control pipe, means for effecting different uniform predetermined ratios between brake cylinder pressure and control pipe pressure, means responsive to vehicle speed and operative through a plurality of speed zones corresponding in number to the number of said different predetermined ratios for selecting a ratio corresponding to the speed zone at which the vehicle is traveling upon the applications of the brakes, and means responsive to the load on the vehicle wheels for also varying the ratio between brake cylinder pressure and control pipe pressure for each unit.

13. In a brake equipment for vehicles, in combination, a control pipe, means for supplying fluid under pressure to said control pipe in accordance with a desired degree of braking, a plurality of braking units each comprising a brake cylinder, and means for controlling the supply of fluid under pressure to said brake cylinder in accordance with the pressure in said control pipe, means for effecting different predetermined uniform ratios between brake cylinder pressure and control pipe pressure, means responsive to vehicle speed and operative through a plurality of speed zones corresponding in number to the number of said different predetermined ratios for selecting a ratio corresponding to the speed zone at which the vehicle is traveling upon the application of the brakes, means on each braking unit corresponding to the load on the vehicle wheels at that unit for also varying the ratio between brake cylinder pressure and control pipe pressure, relay means effective upon the selection of one of said plurality of ratios for maintaining said ratio during the deceleration of the vehicle to a predetermined low speed, and means operative at said predetermined low speed for reducing the ratio between brake cylinder pressure and control pipe pressure to a lower one of said predetermined ratios.

14. In a brake equipment for vehicles, in combination, a control pipe, means for supplying fluid under pressure to said control pipe in accordance with the desired degree of braking, a brake cylinder, and means for controlling the supply of fluid under pressure to said brake cylinder in accordance with the pressure in said control pipe comprising self-lapping valve means and means for actuating said valve means toward a brake applying position having a chamber subject to control pipe pressure and a valve control member responsive to the pressure in said chamber and having means for actuating said valve means from a brake applying position toward a brake releasing position comprising a chamber subject to brake cylinder pressure and a second valve control member responsive to the pressure in said chamber, additional chambers chargeable selectively with fluid under pressure for modifying the forces on said two valve control means and thereby providing a plurality of predetermined uniform ratios between brake cylinder pressure and control pipe pressure regardless of the pressure in the control pipe and means responsive to vehicle speed for controlling the pressures in said additional chambers in accordance with the speed of the vehicle at the time the brakes are applied.

15. In a brake equipment for vehicles, in combination, a control pipe, means for supplying fluid under pressure to said control pipe in accordance with the desired degree of braking, a brake cylinder, and means for controlling the supply of fluid under pressure to said brake cylinder in accordance with the pressure in said control pipe comprising self-lapping valve means, a chamber subject to control pipe pressure, and valve control means for actuating said self-lapping valve means toward a brake applying position upon an increase in pressure in said chamber, a second chamber subject to brake cylinder pressure and valve control means for actuating said self-lapping valve means from a brake applying position toward a brake releasing position upon an increase in brake cylinder pressure, additional chambers for modifying the forces on said two valve control means for producing a plurality of predetermined ratios between brake cylinder and control pipe pressure, and means comprising magnet valve devices and speed responsive switches responsive to vehicle speed for controlling the pressure in said additional chambers.

16. In a brake equipment for vehicles, in combination, a brake cylinder, a normally charged pipe, means for controlling the supply of fluid under pressure to said brake cylinder in accordance with the reduction in pressure in said normally charged pipe, means for governing said brake controlling means including a magnet valve device, a source of electric energy and a control circuit therefor, and a pressure operated switch operative upon a predetermined reduction in pressure in said normally charged pipe for effecting interruption of said control circuit.

17. In a vehicle or train brake system, in combination, a brake cylinder, a pipe chargeable with fluid at different pressures, brake control means operative upon the charging of said pipe with fluid under pressure to cause to be established in the brake cylinder a fluid pressure having only certain predetermined uniform ratios to the pressure established in the said pipe, and means controlled according to the speed of the vehicle or train for so controlling the brake control means as to cause it to establish a brake cylinder pressure having a different one of said certain predetermined uniform ratios to the pressure in the said pipe for different train speeds.

18. In a vehicle or train brake system, in combination, a brake cylinder, a pipe chargeable with fluid at different pressures, brake control means operative upon the charging of said pipe with fluid under pressure for causing to be established in the brake cylinder a fluid pressure having only certain predetermined uniform ratios to the pressure established in the said pipe, and means controlled according to the speed of the vehicle or train for so controlling the brake control means as to cause it to establish a brake cylinder pressure having only one of said certain predetermined uniform ratios to the pressure in the said pipe when the speed of the vehicle or train is within one range of speeds and for causing it to establish a brake cylinder pressure having only a different one of said certain predetermined uniform ratios to the pressure established in the said pipe when the speed of the vehicle is within a different range of speeds.

19. In a vehicle or train brake system, in combination, a brake cylinder, a pipe normally charged with fluid under pressure, a normally uncharged pipe, means operative upon a reduction of the pressure in said normally charged pipe for establishing different degrees of fluid pressure in the said normally uncharged pipe dependent upon the degree of reduction in pressure in the said normally charged pipe, brake control means effective upon the charging of the normally uncharged pipe with fluid under pressure to cause to be established in the brake cylinder a fluid pressure having only certain predetermined uniform ratios to the pressure established in the normally uncharged pipe, and means controlled according to the speed of the vehicle or train for so controlling the brake control means as to cause it to establish a brake cylinder pressure having one of said certain uniform ratios to the pressure established in the normally uncharged pipe at one speed of the vehicle or train and to establish a brake cylinder pressure having a different one of said certain uniform ratios to the pressure established in the normally uncharged pipe at a different speed of the vehicle or train.

20. In a vehicle or train brake equipment, in combination, a brake cylinder, a pipe normally charged with fluid under pressure, a normally uncharged control pipe, means operative upon a reduction in the pressure in said normally charged pipe for establishing different degrees of fluid pressure in the said control pipe dependent upon the degree of reduction in the pressure in the said normally charged pipe, brake control means effective upon the charging of the said control pipe with fluid under pressure to cause to be established in the brake cylinder a pressure having only certain predetermined uniform ratios to the pressure established in the said control pipe, and means controlled according to the speed of the vehicle or train for controlling the brake control means to cause it to establish a brake cylinder pressure having only one of said certain uniform ratios to the pressure established in the control pipe over one range of vehicle or train speeds and for causing the brake control means to establish a brake cylinder pressure having only a different one of said certain uniform ratios to the pressure established in the said control pipe for a different range of vehicle or train speeds.

21. In a vehicle or train brake equipment, in combination, a brake cylinder, a normally uncharged pipe chargeable with fluid at different pressures, brake control means having a plurality of electroresponsive means and effective upon the charging of said pipe with fluid under pressure and, dependent upon which of the electroresponsive means are energized or deenergized, to selectively cause a pressure to be established in the brake cylinder having any one of a plurality of certain different uniform ratios to the pressure established in the said pipe, and means controlled according to the speed of the vehicle or train for controlling the energization and deenergization of said electroresponsive means.

22. In a vehicle or train brake equipment, in combination, a brake cylinder, a normally uncharged pipe chargeable with fluid at different pressures, brake control means having a plurality of electroresponsive means and effective upon the charging of said pipe with fluid under pressure and, dependent upon which of the electroresponsive means are energized or deenergized, to selectively cause a pressure to be established in the brake cylinder having any one of a plurality of certain different uniform ratios to the pressure established in the said pipe, and means controlled according to the speed of the vehicle or train for so controlling the said electroresponsive means as to cause the brake control means to establish a brake cylinder pressure having one of said certain different uniform ratios to the pressure established in the said pipe for one range of vehicle speeds, and a different one of said certain different uniform ratios to the pressure established in the said pipe for a different range of train speeds.

23. In a vehicle or train brake equipment, in combination, a brake cylinder, a pipe normally charged with fluid under pressure, a normally uncharged control pipe, means operative upon a reduction in pressure in the said normally charged pipe for establishing different degrees of fluid pressure in the said control pipe dependent upon the degree of reduction in the pressure in the said normally charged pipe, brake control means having a plurality of electroresponsive means and effective upon the charging of said control pipe with fluid under pressure and dependent upon which of the electroresponsive means are energized or deenergized to selectively cause a pressure to be established in the brake cylinder having any one of a plurality of certain different uniform ratios to the pressure established in the said control pipe, and means controlled according to the speed of the vehicle or train for controlling the energization and deenergization of said electroresponsive means.

24. In a vehicle or train brake equipment, in combination, a brake cylinder, a normally uncharged pipe chargeable with fluid at different pressures, brake control means effective upon the charging of said pipe with fluid under pressure to cause to be established in the brake cylinder a fluid pressure having only certain different predetermined uniform ratios to the pressure established in the said pipe, means controlled according to the speed of the vehicle or train for controlling the brake control means to cause it to establish a brake cylinder pressure having a different one of said certain predetermined ratios to the pressure established in the said pipe for each of a plurality of different ranges of vehicle speed, and means effective upon the charging of said pipe with fluid under pressure for preventing variations from the initially established ratio between brake cylinder pressure and the pressure established in said pipe when the vehicle or train reduces in speed from a speed within the range of speed, at the time the application of the brakes is initiated, to a speed within a lower speed range.

25. In a vehicle or train brake equipment, in combination, a brake cylinder, a normally uncharged pipe chargeable with fluid at different pressures, brake control means effective upon the charging of said pipe with fluid under pressure to cause to be established in the brake cylinder a fluid pressure having only certain different predetermined uniform ratios to the pressure established in the said pipe, means controlled according to the speed of the vehicle or train for controlling the brake control means to cause it to establish a brake cylinder pressure having a different one, respectively, of said certain predetermined ratios to the pressure established in the said pipe for each of a plurality of different ranges of vehicle speed, means effective to prevent variations from the initially established ratio between brake cylinder pressure and the pressure established in said pipe when the vehicle or train reduces in speed from a speed within the range of speed at the time the application of the brakes is initiated to a speed within a lower speed range, and means effective when the speed of the vehicle or train reduces to below a certain predetermined speed for rendering the said last means ineffective to prevent variation from the initially established ratio between brake cylinder pressure and the pressure established in the said pipe.

26. In a vehicle or train brake equipment, in combination, a brake cylinder, brake control means for controlling the degree of pressure in the said brake cylinder, means controlled according to the speed of the vehicle or train for controlling the brake control means to cause it to establish different degrees of brake cylinder pressure at corresponding different speeds, and means controlled according to the load on the vehicle or train for also controlling the brake control means to cause it to establish different degrees of pressure in the brake cylinder for corresponding different loads on the vehicle.

27. In a vehicle or train brake equipment, in combination, a brake cylinder, a normally uncharged pipe, chargeable with fluid at different pressures, brake control means effective upon the charging of the said pipe with fluid under pressure to cause a pressure to be established in the brake cylinder having only certain different predetermined uniform ratios to the pressure established in the said pipe, means controlled according to the speed of the vehicle or train for controlling the brake control means to cause it to establish pressures in the brake cylinder having different ones of said certain uniform ratios to the pressure in the said pipe for different speeds of the vehicle or train, and means controlled according to the load on the vehicle or train for causing the brake control means to vary the ratio between the brake cylinder pressure and the pressure in the said pipe at each of the said speeds.

28. In a vehicle or train brake equipment, in combination, a brake cylinder, a control pipe normally uncharged and chargeable with fluid at different pressures, a self-lapping valve device including a supply valve and a release valve for respectively controlling the supply of fluid under pressure to the brake cylinder and the release of fluid under pressure from the brake cylinder, and a floating lever shiftable bodily in one direction to effect seating of the release valve and unseating of the supply valve, and shiftable in the opposite direction to effect unseating of the release valve and seating of the supply valve, fluid pressure responsive means subject to the pressure established in the control pipe for effecting the shifting of the said floating lever bodily in the said one direction to cause fluid under pressure to be supplied to the brake cylinder, and a separate fluid pressure responsive means subject to the pressure of the fluid supplied to the brake cylinder and effective in opposition to the force exerted by the first fluid pressure responsive means to cause the said floating lever to be shifted in the opposite direction.

29. In a vehicle or train brake equipment, in combination, a brake cylinder, a normally uncharged control pipe chargeable with fluid at different pressures, a self-lapping valve device including a supply valve and a release valve for respectively supplying fluid under pressure to and releasing fluid under pressure from the brake cylinder and a floating lever shiftable bodily in one direction to effect seating of the release valve and unseating of the supply valve and shiftable bodily in the opposite direction to effect unseating of the release valve and seating of the supply valve, a beam, a fulcrum for said beam, means for shifting the fulcrum according to variations in load on the vehicle, fluid pressure responsive means subject to the pressure in the control pipe for exerting a force on said beam at one side of the said fulcrum, fluid pressure responsive means subject to the pressure in the brake cylinder and adapted to exert a force on the beam at the opposite side of said fulcrum, the floating lever of the self-lapping valve device being bodily shifted according to the movement of the said beam on the said fulcrum.

30. In a vehicle or train brake equipment, in combination, a pipe normally charged with fluid under pressure, means controlled according to variations of pressure in said pipe for controlling the degree of application and the release of the brakes and variously conditionable to cause different degrees of application of the brakes for a given amount of reduction of pressure in said pipe, electroresponsive means effective, when energized, to permit variation in the condition of the brake controlling means so that the brake controlling means may cause different degrees of application of the brakes for a given amount of reduction of pressure in said pipe, and means responsive to a certain reduction of pressure in said pipe for preventing energization of said electroresponsive means.

31. In a vehicle or train brake system, in combination, a pipe normally charged with fluid under pressure, means controlled according to variations of pressure in said pipe for controlling the degree of application and the release of the brakes, means effective in response to variations in load carried by the vehicle for correspondingly variously conditioning the said brake controlling means to effect different degrees of application of the brakes for a given reduction of pressure in said pipe, electroresponsive means effective, when deenergized, to render said last means functionally ineffective, and means responsive to at least a certain uniform reduction of pressure in said pipe from the normal pressure therein for causing deenergization of said electroresponsive means.

32. In a vehicle fluid pressure brake, in combination, a brake cylinder, a valve device having two chambers and operated by the cooperative action of fluid pressures in said chambers for supplying fluid to said brake cylinder at a pressure proportional to the pressures in said chambers, valve means operative in effecting an application of the brakes for supplying fluid under pressure to both of said chambers, and means controlled by a variable operating condition of the vehicle for varying the pressure of fluid obtained from said valve means in one only of said chambers.

33. In a fluid pressure brake for a vehicle operating under a plurality of variable operating conditions, in combination, valve means operated by fluid under pressure for supplying fluid under pressure to effect an application of the brakes, a brake controlling valve device operative to supply fluid under pressure for effecting the operation of said valve means, means controlled according to one variable operating condition of the vehicle, and means controlled according to another variable operating condition of the vehicle, both of said means cooperating for modifying the operation of said valve means by the pressure of fluid supplied by said brake controlling valve device.

34. In a fluid pressure brake system for vehicles, in combination, a brake cylinder, valve means for controlling the supply and release of fluid under pressure to and from the brake cylinder, movable abutment means subject to the opposing pressures of fluid in the brake cylinder and in a chamber for operating said valve means, a control pipe, means for supplying fluid under pressure to said control pipe, and vehicle speed controlled means for controlling the supply of fluid under pressure from said control pipe to said chamber and the release of fluid from said chamber, said movable abutment means being subject to the fluid pressure in a second chamber which is adapted to be constantly subject to the pressure of fluid in said control pipe.

35. In a fluid pressure brake system for vehicles, in combination, a brake cylinder, valve means for controlling the supply and release of fluid under pressure to and from the brake cylinder, movable abutment means subject to the opposing pressures of fluid in the brake cylinder and in a chamber for operating said valve means, a control pipe, means for supplying fluid under pressure to said control pipe, and vehicle speed controlled means for controlling the supply of fluid under pressure from said control pipe to said chamber and the release of fluid from said chamber, said movable abutment means being subject to the fluid pressure in a second chamber which is adapted to be constantly subject to the pressure of fluid in said control pipe, the pressure of fluid in said second chamber opposing the brake cylinder pressure acting on said movable abutment means.

36. In a fluid pressure brake system for vehicles, in combination, a brake cylinder, valve means for controlling the supply and release of fluid under pressure to and from the brake cylinder, movable abutment means subject to the opposing pressures of fluid in the brake cylinder and in a chamber for operating said valve means, a control pipe, a brake valve device for controlling the supply and release of fluid under pressure to and from said control pipe, and vehicle speed controlled means for controlling the supply of fluid under pressure from said control pipe to said chamber and the release of fluid from said chamber, said movable abutment means being subject to the fluid pressure in a second chamber which is adapted to be constantly subject to the pressure of fluid in said control pipe.

37. In a fluid pressure brake system for vehicles, in combination, a brake cylinder, valve means for controlling the supply and release of fluid under pressure to and from the brake cylinder, movable abutment means operable by variations in fluid pressure in a chamber for operating said valve means, a control pipe, means for supplying fluid under pressure to said pipe, and speed controlled means for controlling communication through which fluid is supplied from said control pipe to said chamber and the release of fluid from said chamber, said movable abutment means being subject to the fluid pressure in a second chamber which is adapted to be charged with fluid under pressure directly from the control pipe.

38. In a fluid pressure brake system for vehicles, in combination, a brake cylinder, valve means for controlling the supply and release of fluid under pressure to and from the brake cylinder, movable abutment means subject to the opposing pressure of fluid in the brake cylinder and in a chamber and operated upon an increase in fluid pressure in said chamber for actuating said valve means to supply fluid under pressure to the brake cylinder and upon a release of fluid from said chamber to actuate said valve means to release fluid under pressure from the brake cylinder, and speed controlled means for completely releasing fluid from said chamber when the vehicle reduces below a certain speed, said movable abutment means being subject to the fluid pressure in a chamber adapted to be charged with fluid under pressure independently of said speed controlled means and acting in a direction to cause said valve means to cut off the release of fluid from the brake cylinder.

39. In a vehicle or train brake equipment, in combination, a brake cylinder, brake control means operatively responsive to the pressure of fluid supplied thereto to open a communication through which fluid under pressure is supplied to the brake cylinder to establish therein a pressure corresponding to the supply pressure, electroresponsive means effective, dependent upon being energized or deenergized, to condition the brake control means differently so as to establish different fluid pressures in the brake cylinder for the same pressure of fluid supplied to the brake control means, and means controlled according to the speed of the vehicle for controlling energization and deenergization of said electroresponsive means.

40. In a vehicle or train brake equipment, in combination, a brake cylinder, brake control means operatively responsive to the pressure of fluid supplied thereto for establishing a corresponding fluid pressure in the brake cylinder, electroresponsive means effective, dependent upon being energized or deenergized, to condition the brake control means differently so as to establish different fluid pressures in the brake cylinder for the same pressure of fluid supplied to the brake control means, means controlled according to the speed of the vehicle for controlling energization and deenergization of said electroresponsive means, and means controlled according to the load on the vehicle for also causing the brake control means to establish different fluid pressures in the brake cylinder for the same pressure of fluid supplied to the brake control means.

JOHN W. LOGAN, Jr.